United States Patent [19]
Suzuki

[11] Patent Number: 5,963,873
[45] Date of Patent: Oct. 5, 1999

[54] DIGITAL MULTIPLEX RADIO SYSTEM

[75] Inventor: Toshiaki Suzuki, Sendai, Japan

[73] Assignee: Fujitsu Limited, Kanagawa, Japan

[21] Appl. No.: 08/844,730

[22] Filed: Apr. 21, 1997

[30] Foreign Application Priority Data

Dec. 20, 1996 [JP] Japan .................................. 8-340868

[51] Int. Cl.[6] .................................................. H04Q 7/22
[52] U.S. Cl. .................................... 455/560; 455/403
[58] Field of Search .................................. 370/907, 535,
370/906, 228; 455/403, 422, 560, 561,
312, 63, 67.5, 130

[56] References Cited

U.S. PATENT DOCUMENTS

| | | | |
|---|---|---|---|
| 4,435,704 | 3/1984 | Hashimoto | 370/223 |
| 4,477,895 | 10/1984 | Casper | 370/228 |
| 4,688,210 | 8/1987 | Eizenhofer et al. | 455/502 |
| 4,868,811 | 9/1989 | Suzuki | 370/436 |
| 4,906,989 | 3/1990 | Kasugai | 340/825.44 |
| 4,967,194 | 10/1990 | Haruki | 340/825.48 |
| 5,109,535 | 4/1992 | Kume et al. | 455/67.5 |
| 5,457,691 | 10/1995 | Romeijn | 370/510 |
| 5,570,344 | 10/1996 | Fujii | 340/827 |
| 5,587,996 | 12/1996 | Mizuno | 370/228 |
| 5,631,896 | 5/1997 | Kawase et al. | 370/228 |
| 5,844,924 | 12/1998 | Nagamoto | 455/422 |
| 5,848,353 | 12/1998 | Matsumoto | 455/422 |

*Primary Examiner*—Dwayne D. Bost
*Assistant Examiner*—Jean A. Gelin
*Attorney, Agent, or Firm*—Helfgott & Karas, P.C.

[57] ABSTRACT

There is provided a digital multiplex radio system using microwaves in an SDH communication network, in which the installation space, wiring space and wiring cost are decreased. Each of unit cases is arranged for each of a plurality of active lines and at least one spare line. The unit cases have the same configuration, and are portable and replaceable. Each of the unit cases includes a base band processing section, modulating section, transmitting section, receiving section, demodulating section, transmission switching section, and receiving end switching section. In the present invention, the functions located between the SDH Physical Interface (SPI) specified in the ITU-TG783 and the Radio Physical Interface (RPI) specified in the ITU-RF.750 are unified in the SDH communication system.

10 Claims, 6 Drawing Sheets

DIGITAL MULTIPLEX RADIO SYSTEM

BACKGROUND OF THE INVENTION

(1) Field of the Invention

The present invention relates to a digital multiplex radio system using microwaves in a Synchronous Digital Hierarchy (SDH) communication network and, more particularly, to a digital multiplex radio system which, having a plurality of active lines and at least one spare line, transmits and receives radio signals with a Synchronous Transfer Mode (STM) signal used as a base band signal.

(2) Description of the Related Art

Concerning a public communication network of trunk line and branch line systems, a demand for unifying international interfaces for wide band communication service has recently been increased and the SDH was standardized by the International Telecommunications Union (ITU). The microwave multiplex radio system based on this standard presents a problem in that the hardware is usually large.

Conventionally, the multiplex radio system is composed of a transmitting section, receiving section, modulating section, demodulating section, base band processing section, switching section having a transmission switching function and a receiving end switching function, supervisory function section, circuit control section, timing clock supply section, order-wire communication function section, Data Communication Channel (DCC) processing section, and so on, and each of these sections is contained in a separate independent case. Usually, the case is of a card shape, and mounted in a slot in a rack. A back wire board provided at the inner part of slot connects respective cards to each other. However, the receiving section is connected to the demodulating section and the modulating section is connected to the transmitting section via a high-frequency coaxial cable, and the supervisory section and circuit control section are connected respectively to an opposite card via a cable with mulipin connector as well as the back wire board.

In the above-described conventional multiplex radio system, however, since the respective principal sections constituting the system are contained in a separate independent case, a wide installation space is required as the whole system, posing problems of installation space and wiring cost. Further, the signals with a different speed are sent complicatedly over a long distance by using the wiring, resulting in a problem of electro magnetic interference caused on other equipment and systems.

Also, when the sections constituting the system are divided finely and each of them is contained in a separate independent case, a repair of fault often requires much time if the system fails. That is, because a rapid repair of fault is desired if the system fails, on the occurrence of fault a maintenance personnel, taking a set of normal cases, hastens to the failed system. He replaces respective cases suspected to have a fault in the failed system one after another with a normal corresponding case to hastily carry out the repair of fault. However, the number of cases are large because the sections constituting the system are divided finely, so that it sometimes takes much time to find the faulty case.

Further, in the SDH communication system, the supervision of state must be exercised for each independent unit (card). Therefore, a lot of alarm information is collected in the supervisory function section from the divided units, posing a problem of great processing load of the supervisory function section.

SUMMARY OF THE INVENTION

An object of the present invention is to provide a digital multiplex radio system in which the installation space of the whole system is decreased and the wiring space and cost are reduced.

Another object of the present invention is to provide a digital multiplex radio system in which electro magnetic interference caused by the laying of wires is prevented.

Still another object of the present invention is to provide a digital multiplex radio system in which the time taken for the repair of fault is shortened.

Still another object of the present invention is to provide a digital multiplex radio system in which the processing load of the supervisory function section is relieved.

To achieve the above objects, there is provided a digital multiplex radio system which, having a plurality of active lines and at least one spare line, transmits and receives a radio signal with a Synchronous Transfer Mode (STM) signal used as a base band signal. This digital multiplex radio system comprises a plurality of unit cases which have the same configuration, and are portable and replaceable, and one of which is provided for each of a plurality of active lines and at least one spare line; a base band processing section, which is contained in each of the unit cases, for inserting Section Over Head (SOH) bite in the STM signal or extracting SOH bite from the STM signal; a modulating section, which is contained in each of the unit cases, for modulating the base band signal and outputting the modulated signal; a transmitting section, which is contained in each of the unit cases, for converting the modulated signal from the modulating section into a radio signal and transmitting the radio signal; a receiving section, which is contained in each of the unit cases, for receiving the radio signal and converting it into a modulated signal; a demodulating section, which is contained in each of the unit cases, for converting the modulated signal from the receiving section into a base band signal; a transmission switching section, which is contained in each of the unit cases, for sending the base band signal on the self-line to the self-line and the spare line; and a receiving end switching section, which is contained in each of the unit cases, for selecting one signal out of the base band signals sent from the self-line and the spare line and sending the selected signal to the self-line.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention for a digital multiplex radio system will be described below with reference to the drawings.

Figure 1:
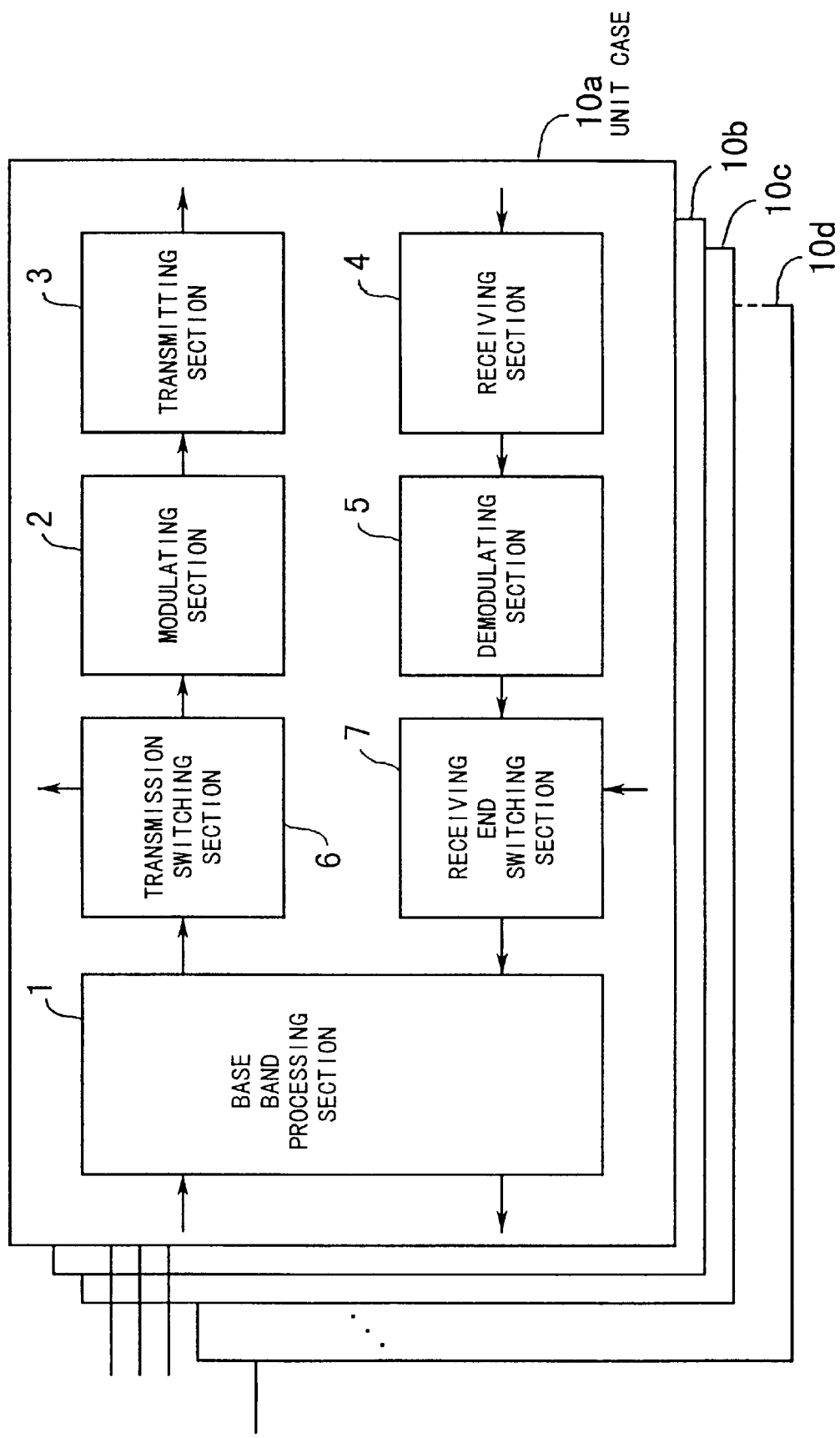
FIG. 1 is a view for illustrating the principle of the present invention.

First, the principle of a first embodiment will be described with reference to FIG. 1. In the first embodiment, one of a plurality of unit cases 10a to 10d which have the same configuration, and are portable and replaceable, is provided for each of a plurality of active lines and at least one spare line. Each of the unit cases 10a to 10d has a base band processing section 1 for inserting Section Over Head (SOH) bite in a Synchronous Transfer Mode (STM) signal or for extracting SOH bite from the STM signal, a modulating section 2 for modulating the base band signal and outputting the modulated signal, a transmitting section 3 for converting the modulated signal from the modulating section 2 into a radio signal and transmitting the radio signal, a receiving section 4 for receiving the radio signal and converting it into a modulated signal, a demodulating section 5 for converting the modulated signal from the receiving section 4 into a base band signal, a transmission switching section 6 for sending the base band signal on the self-line to the self-line and the spare line via another line, and a receiving end switching section 7 for selecting one signal out of the base band signals sent from the self-line and the spare line via another line and sending the selected signal to the self-line.

As described above, one of the unit cases 10a to 10d is arranged for each of a plurality of active lines and at least one spare line. The unit cases 10a to 10d have the same configuration, and are portable and replaceable. Each of the unit cases 10a to 10d includes the base band processing section 1, modulating section 2, transmitting section 3, receiving section 4, demodulating section 5, transmission switching section 6, and receiving end switching section 7. In the present invention, the functions located between the SDH Physical Interface (SPI) specified in the International Telecommunications Union—Telecommunications Standardization Section (ITU-T) G.783 and the Radio Physical Interface (RPI) specified in the International Telecommunications Union—Radio Communications Section (ITU-R) F.750 are unified in the SDH communication system.

Such a unified configuration decreases the installation space of the whole system and reduces the wiring space and cost.

Also, electro magnetic interference is prevented because the laying of wires on the outside of case is decreased.

Also, the unified configuration significantly decreases the number of cases as compared with the conventional divided configuration, so that the time taken for the repair of fault is shortened.

Further, the unified configuration decreases the number of cases to be supervised by the supervisory function section, by which the processing load of the supervisory function section is relieved.

The following is a detailed description of the first embodiment.

Figure 2:
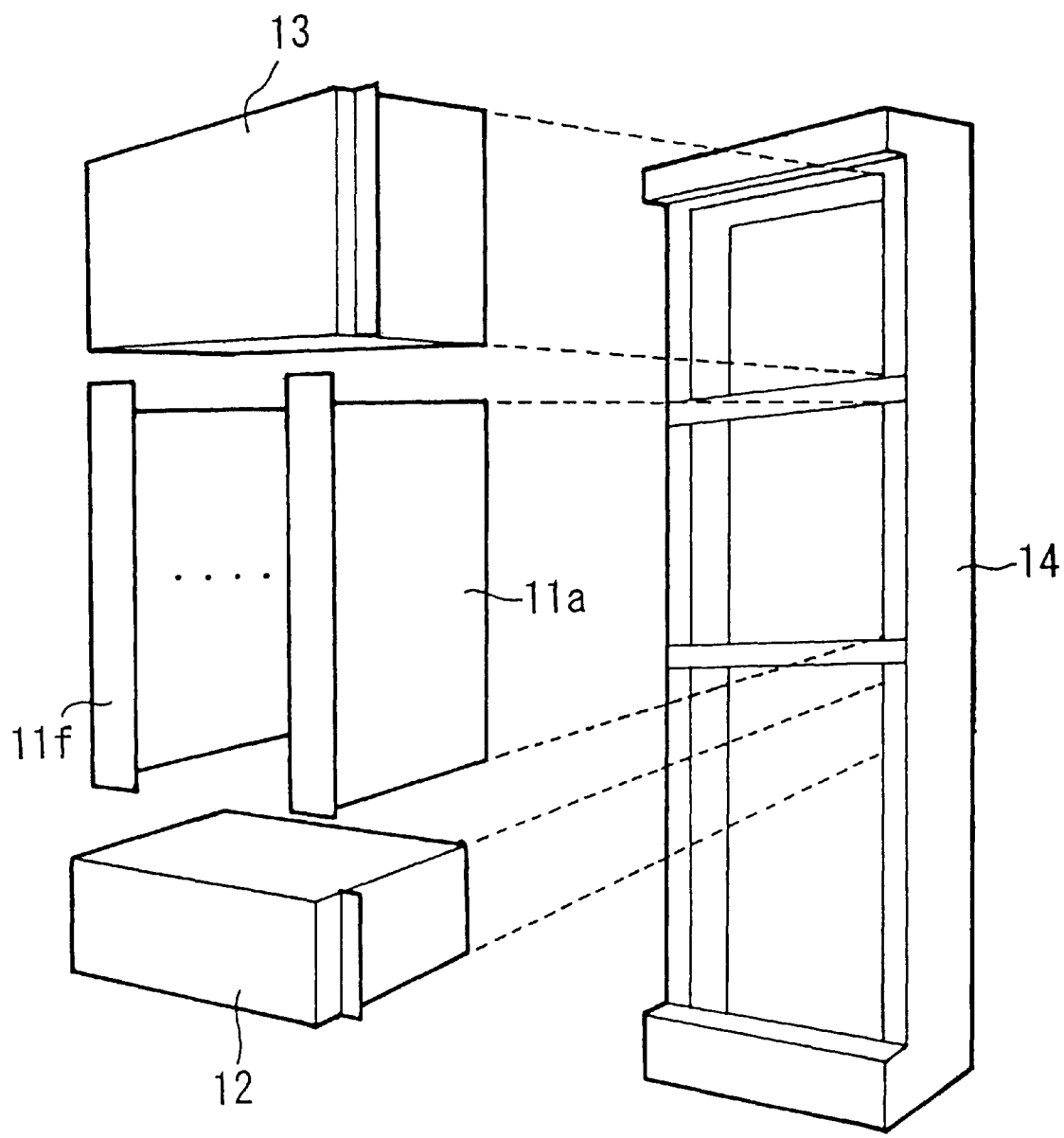
FIG. 2 is a view showing an appearance of a first embodiment.

FIG. 2 shows an appearance of the first embodiment. In this embodiment, it is assumed that n number of active lines and one spare line are provided to transmit and receive radio signals with an STM-1 signal used as a base band signal. In FIG. 2, one of (n+1) number of unit cases 11a to 11f is provided correspondingly for each line, and one first case 12 and one second case 13 are provided as equipment common to the lines. The unit cases 11a to 11f are mounted in the center of a rack 14, the first case 12 is mounted in the rack 14 below the unit cases 11a to 11f, and the second case 13 is mounted in the rack 14 above the unit cases 11a to 11f. The unit cases 11a to 11f have the same configuration, and are portable and capable of being removed from the rack 14 to be replaced. The internal configuration of the unit cases 11a to 11f will be described with reference to FIG. 3, and that of the first case 12 and second case 13 with reference to FIG. 4.

Figure 3:
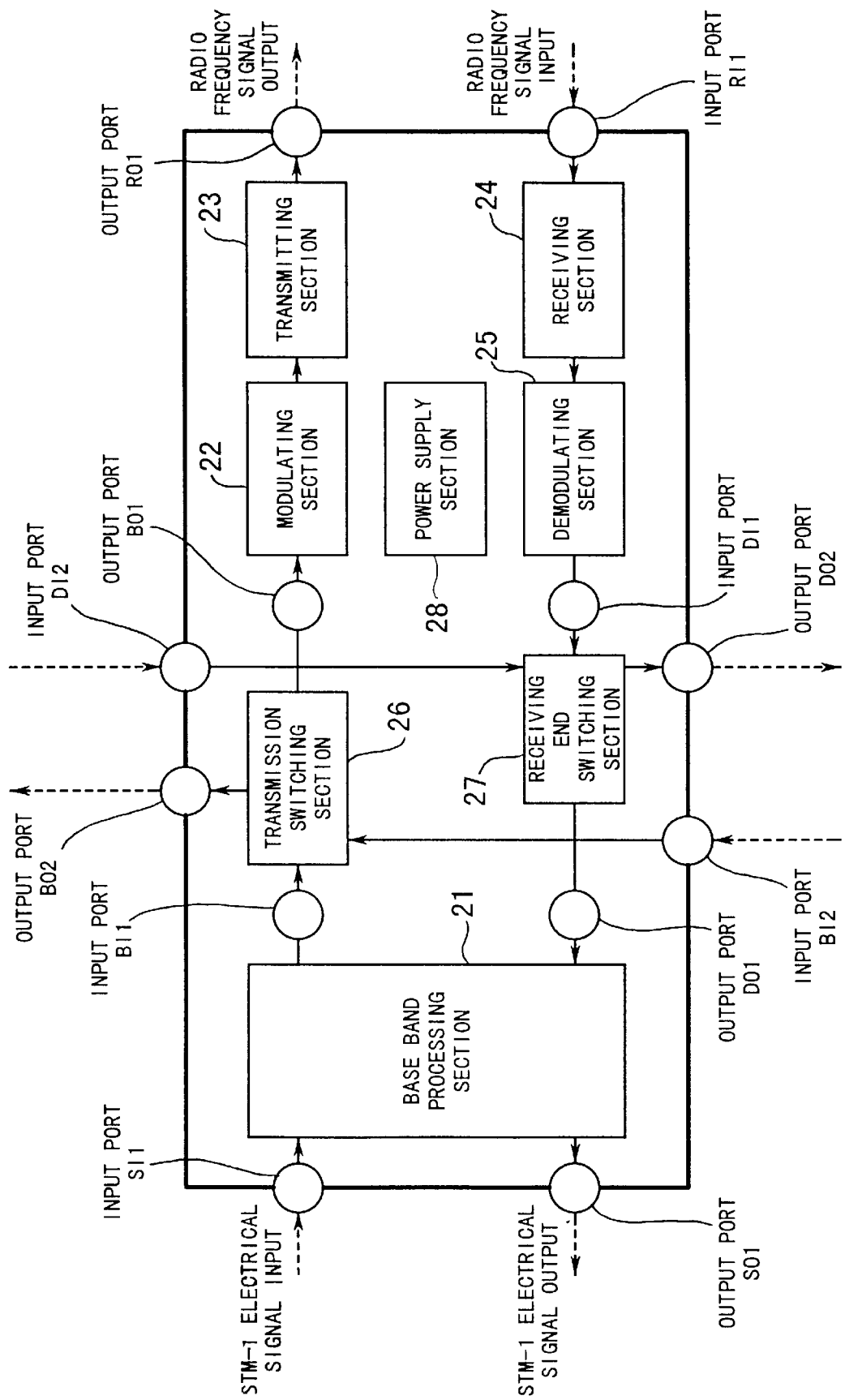
FIG. 3 is a view showing an internal circuit configuration of a unit case.

FIG. 3 shows the internal circuit configuration of the unit cases 11a to 11f. Because the unit cases 11a to 11f have the same configuration, explanation of only one unit case will be made in FIG. 3.

The unit case is provided with a base band processing section 21, modulating section 22, transmitting section 23, receiving section 24, demodulating section 25, transmission switching section 26, receiving end switching section 27, and power supply section 28 in the interior thereof. The base band processing section 21 extracts Section Over Head (SOH) bite applied to an STM-1 electrical signal by receiving the STM-1 electrical signal from an input port SI1 or inserts SOH bite in the STM-1 electrical signal to output it from an output port SO1. The modulating section 22 executes multilevel quadrature modulation of base band signal to output an IF signal of intermediate frequency band. The transmitting section 23 converts the IF signal from the modulating section 22 into a desired radio frequency signal and outputs it from an output port RO1 after amplifying to a desired output power. The receiving section 24 receives the radio frequency signal from an opposite radio station through an input port RI1 and converts it into an IF signal. The demodulating section 25 demodulates the IF signal from the receiving section 24 and converts it into a base band signal.

The input ports SI1 and RI1 and the output posrts SO1 and RO1 are provided on the surface of the unit case.

When the self unit case is provided on an active line, the transmission switching section 26 sends a base band signal, which is inputted from the base band processing section 21 via an input port BI1, to the modulating section 22 of the self unit case via an output port BO1 in accordance with the instructions from the later-described circuit control section 33b, and sends it to the transmission switching section of unit case on the spare line via an output port BO2 of the self unit case and further via the transmission switching section of unit case on the adjacent active line. When a base band signal is sent from the transmission switching section of unit case on another active line via an input port BI2, the transmission switching section 26 transfers it to the transmission switching section of unit case on the spare line via the output port BO2 and further via the transmission switching section of unit case of the adjacent active line.

When the self unit case is provided on an active line, the receiving end switching section 27 sends either of the base band signal inputted from the demodulating section 25 via an input port DI1 and the base band signal sent from the transmission switching section of unit case on the spare line via the receiving end switching section of unit case on the adjacent active line and further via an input port DI2 of the self unit case to the base band processing section 21 of the self unit case via an output port DO1 selectively in accordance with the instructions from the later-described circuit control section 33b. The base band signal sent from the receiving end switching section of unit case on the spare line via the receiving end switching section of unit case on the adjacent active line is transferred to the receiving end switching section of unit case on another active line via an output port DO2 of the self unit case.

The input ports DI2 and BI2 and the output ports BO2 and DO2 are provided on the surface of unit case.

The transmission switching section 26 and the receiving end switching section 27 are operated to switch one line having a large radio interference due to fading, of the microwaves received by n number of active lines to a spare line, for transmission, so that these sections have a switching speed higher than the fading speed.

The power supply section 28 supplies power to parts constituting the unit case.

The wires for connecting the parts constituting the unit case are naturally contained in the unit case.

Figure 4:
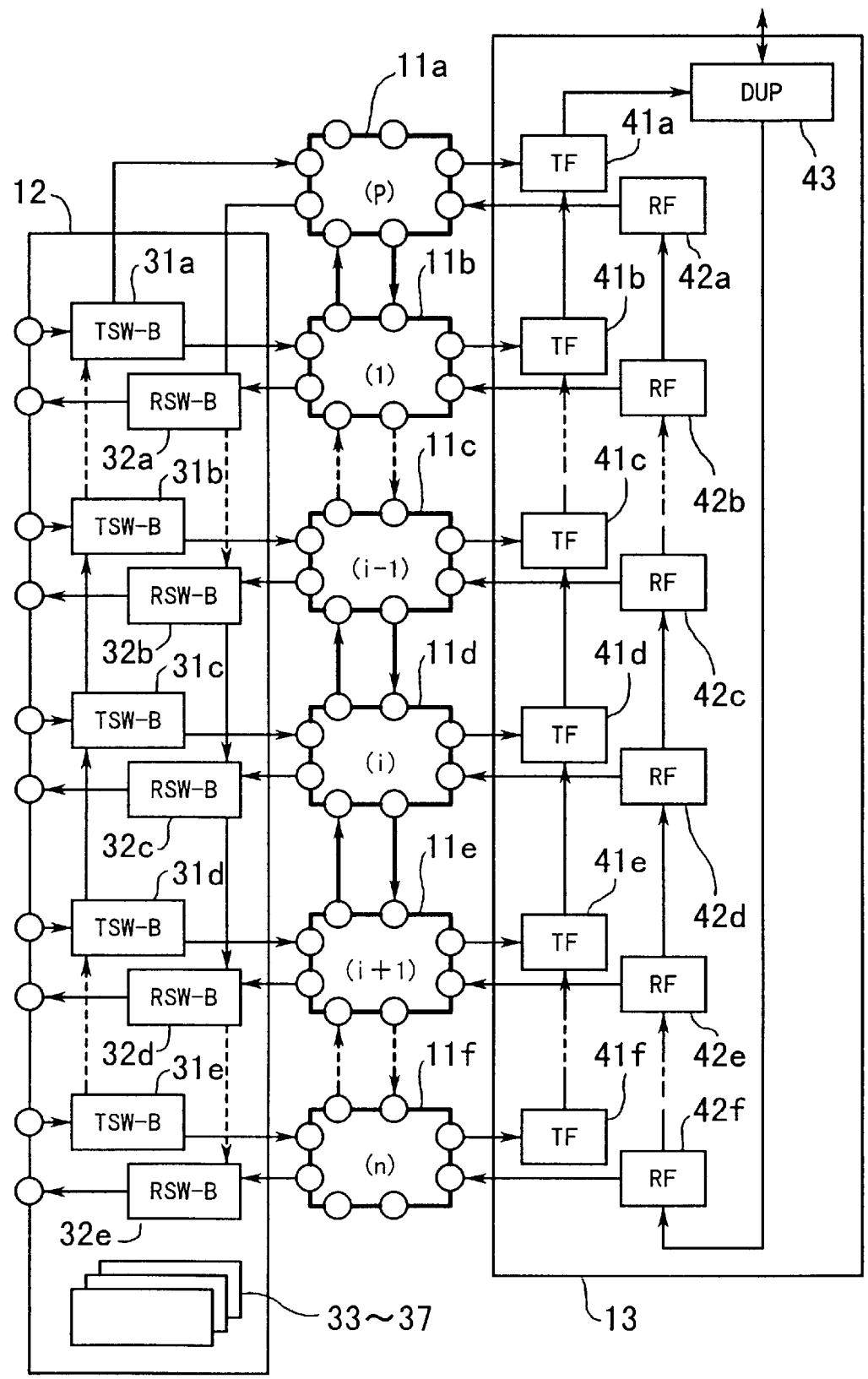
FIG. 4 is a view showing the mutual connecting relation between the unit cases and showing the internal configurations of a first and second cases.

FIG. 4 shows the mutual connecting relation between these unit cases 11a to 11f and shows the internal configurations of the first and second cases 12 and 13. The unit case 11a is provided corresponding to the spare line (P), and the unit cases 11b to 11f are provided corresponding to the active lines (1) to (n). For example, on the unit case 11d on the active line (i), the output port BO2 and the input port DI2 thereof are connected to the input port BI2 and the output port DO2 of the unit case 11c on the active line (i−1), respectively, and the input port BI2 and the output port DO2 of the unit case 11d are connected to the output port BO2 and the input port DI2 of the unit case 11e on the active line (i+1), respectively. However, the output port BO2 and the input port DI2 of the unit case 11a on the spare line (P) and the input port BI2 and the output port DO2 of the unit case 11f on the active line (n) have no connection.

The first case 12 is provided with transmission switches (TSW-B) 31a to 31e, receiving end switches (RSW-B) 32a to 32e, and various function sections 33 to 37. The transmission switches 31a to 31e and the receiving end switches 32a to 32e are provided so as to correspond to the active lines (1) to (n), respectively.

Each of the transmission switches 31a to 31e sends an STM-1 electrical signal of the self-line to the input port SI1 of the unit case on the self-line in accordance with the instructions from the later-described circuit control section 33b, and sends it to the input port SI1 of the unit case on the spare line via the transmission switch on the adjacent active line. When an STM-1 electrical signal is sent from the transmission switch on another active line, each of the transmission switches 31a to 31e sends it to the input port SI1 of the unit case on the spare line via the transmission switch on the adjacent active line.

Each of the receiving end switches 32a to 32e outputs either of the STM-1 signal inputted from the output port SO1 of the unit case on the self-line and the STM-1 signal sent from the unit case on the spare line via the receiving end switch on the adjacent active line to the self-line selectively in accordance with the instructions from the later-described circuit control section 33b. The STM-1 signal sent from the unit case on the spare line via the receiving end switch on the adjacent active line is transferred to the receiving end switch on another active line.

The transmission switches 31a to 31e and the receiving end switches 32a to 32e are operated when the unit case 11a on the spare line is used in place of a faulty unit case if any of the unit cases 11b to 11f on the active line has a fault.

Various function sections 33 to 37 are provided in common to the lines, comprising a supervisory function section 33, circuit control section 34, timing clock supply section 35, order-wire communication function section 36, and Data Communication Channel (DCC) processing section 37. The supervisory function section 33 supervises the state of various types of equipment and lines. The circuit control section 34 controls the switching operation of the transmission switching section and the receiving end switching section of the unit cases 11a to 11f each in accordance with the degree of effect of fading on the received radio wave. Also, the circuit control section 34 controls the switching operation of the transmission switches 31a to 31e and the receiving end switches 32a to 32e in accordance with the circuit state of the active transmission system and the spare transmission system. The timing clock supply section 35 supplies a timing clock for synchronization to the unit cases 11a to 11f. The order-wire communication function section 36 is used when a consultation about maintenance operation etc. is held via a telephone set etc. with another station by using E1, E2 bite allotted to the SOH of STM-1 signal. The DCC processing section 37 performs signal processing of D1 to D3, D4 to D12 bite allotted to the SOH of STM-1 signal to carry out supervisory control remotely.

The second case 13 contains a wave separating device, comprising transmitting filters (TF) 41a to 41f, receiving filters (RF) 42a to 42f, and an antenna sharing device 43. The transmitting filters 41a to 41f and the receiving filters 42a to 42f are provided so as to correspond to the active lines and the spare line. Each of the transmitting filters 41a to 41f performs band limitation of radio frequency signal from the corresponding unit case within the occupied frequency band allotted to the radio frequency signal, and sends the signal to the antenna sharing device 43. Each of the receiving filters 42a t 42f separates a radio frequency signal with a frequency allotted to the corresponding unit case from the radio frequency signals sent from the antenna sharing device 43, and sends the signal to the corresponding unit case. The antenna sharing device 43 sends the radio frequency signal from the transmitting filters 41a to 41f to an antenna (not shown) and sends the radio frequency signal received by the same antenna to the receiving filters 42a to 43f.

As shown in FIG. 2, in the rack 14, the second case 13 is arranged above the unit cases 11a to 11f, and the wires (usually, semirigid pipe cables are used) connecting the second case 13 to the unit cases 11a to 11f are connected at a shortest possible distance by being drawn from the opposed face. Similarly, the first case 12 is arranged below the unit cases 11a to 11f, and the wires connecting the first case 12 to the unit cases 11a to 11f are connected at a shortest possible distace by being drawn from the opposed face.

Thereby, the whole system is made compact, the wiring space is decreased, and naturally the wiring cost is reduced as compared with the conventional system.

Also, since the laying of wires outside the case is decreased significantly, electro magnetic interference is prevented.

Also, since many functions are unified in the unit case, the time taken for the repair of fault is shortened remarkably by replacing the unit case as compared with the conventional divided configuration.

Further, the unified configuration reduces the number of cases to be supervised by the supervisory function section, so that the processing load of the supervisory function section can be relieved.

Further, in the unit case, if a frequency shifter is connected between the output port RO1 for outputting a radio signal and the input port RI1 for inputting a radio signal to turn a signal in the unit case, the transmission test of the unit case can be made easily. Especially in the temperature test, all we have to do is to put only the unit case in a thermostatic oven, so that only a small thermostatic oven is needed, being very convenient.

Further, the transmission switching section 26 of the unit case transfers the base band signal, which is sent from the transmission switching section of the first adjacent unit case toward the spare line, to the transmission switching section of the second adjacent unit case, and the receiving end switching section 27 transfers the base band signal, which is sent from the spare line via the receiving end switching section of the second adjacent unit case, to the receiving end switching section of the first adjacent unit case. Therefore, transmission switching and receiving end switching can be achieved easily by merely connecting the adjacent transmission switching sections to each other and the adjacent receiving end switching sections to each other of all unit cases arranged in parallel.

The following is a description of a second embodiment.

Figure 5:
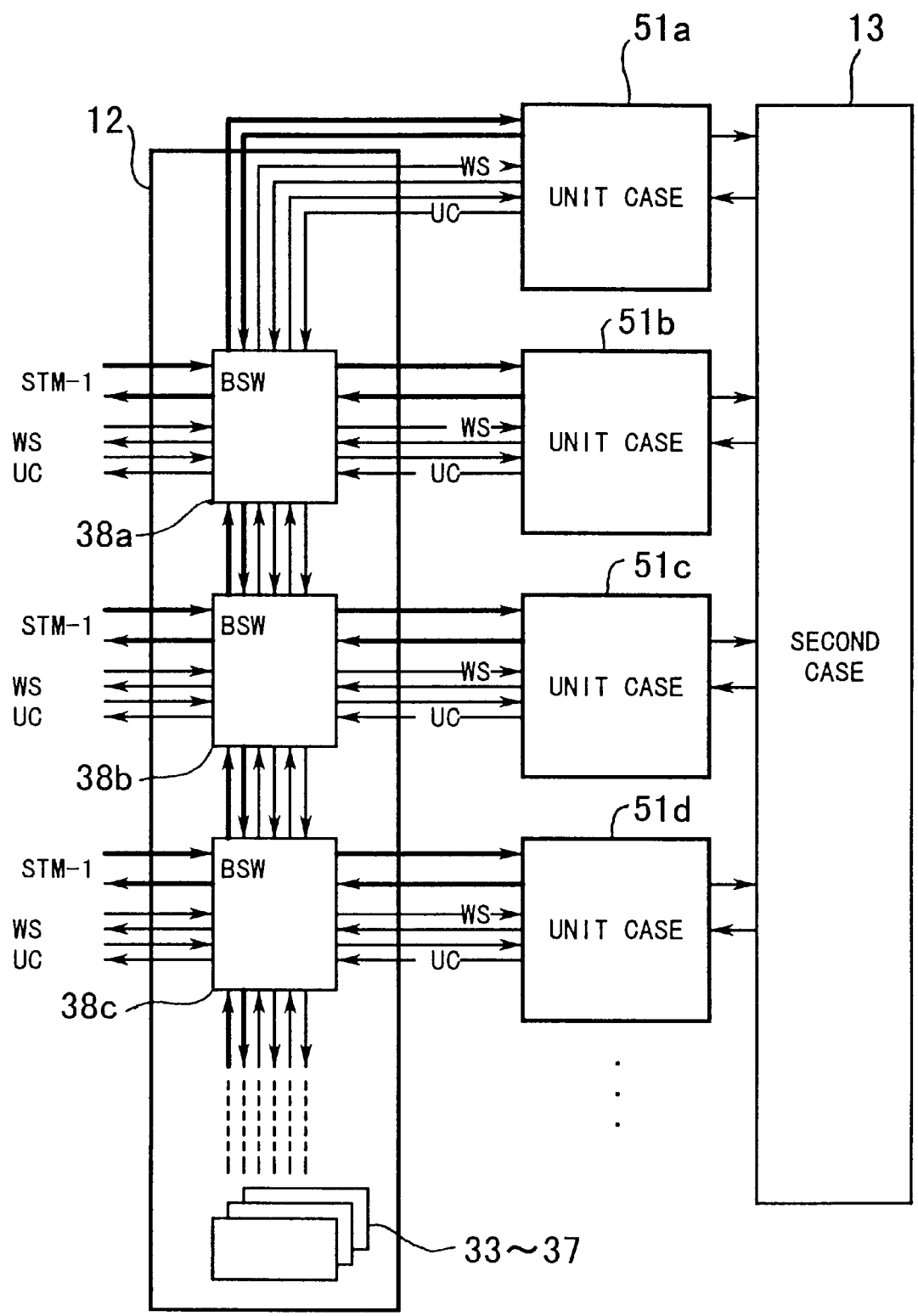
FIG. 5 is a schematic view of a second embodiment.

FIG. 5 is a schematic view of the second embodiment. Since the configuration of the second embodiment is basically the same as that of the first embodiment, the same reference numeral is applied to the same element, and the explanation thereof is omitted.

In the second embodiment, the first case 12 is provided with transmission receiving end switching sections 38a to 38c. The transmission receiving end switching section 38a includes the transmission switch 31a for performing transmission switching of an STM-1 electrical signal and the receiving end switch 32a for performing receiving end switching in the first embodiment. Further, the transmission receiving end switching section 38a includes a transmission switch for performing transmission switching of a Way-Side (WS) signal and a receiving end switch for performing receiving end switching, and also includes a transmission switch for performing transmission switching of a User-Channel (UC) signal and a receiving end switch for performing receiving end switching. The operation of the transmission switch and the receiving end switch included newly is the same as the operation of the transmission switch 31a and the receiving end switch 32a except that the handled signal is changed from the STM-1 electrical signal to the WS signal or the UC signal. The WS signal, which is a signal transmitted by taking advantage of the difference between the actual modulation spectrum occupied frequency band and the allotted occupied frequency band, is used for the communication of the radio section only. The UC signal, which is a signal transmitted by using F1 bite allotted to the SOH of the STM-1 signal, can be used freely by the users.

The transmission receiving end switching sections 38b and 38c have the same configuration as that of the transmission receiving end switching section 38a. The transmission receiving end switching section 38a is provided so as to correspond to the active first line, while the transmission receiving end switching sections 38b and 38c are provided so as to correspond to the active second and third lines, respectively.

The unit cases 51a to 51d have the same configuration as that of the unit case of the first embodiment except that the function for processing the WS signal and the UC signal is added. The unit case 51a corresponds to the spare line, and the unit cases 51b to 51d correspond to the active first to third lines, respectively. Each of the unit cases 51a to 51d is provided with input ports for inputting the WS signal and the UC signal and output ports for outputting the WS signal and the UC signal in such a manner as to be positioned on the surface facing the first case 12.

As in the above-described second embodiment, the present invention can be applied to a digital multiplex radio system which handles the WS signal and the UC signal.

The following is a description of a third embodiment.

Figure 6:
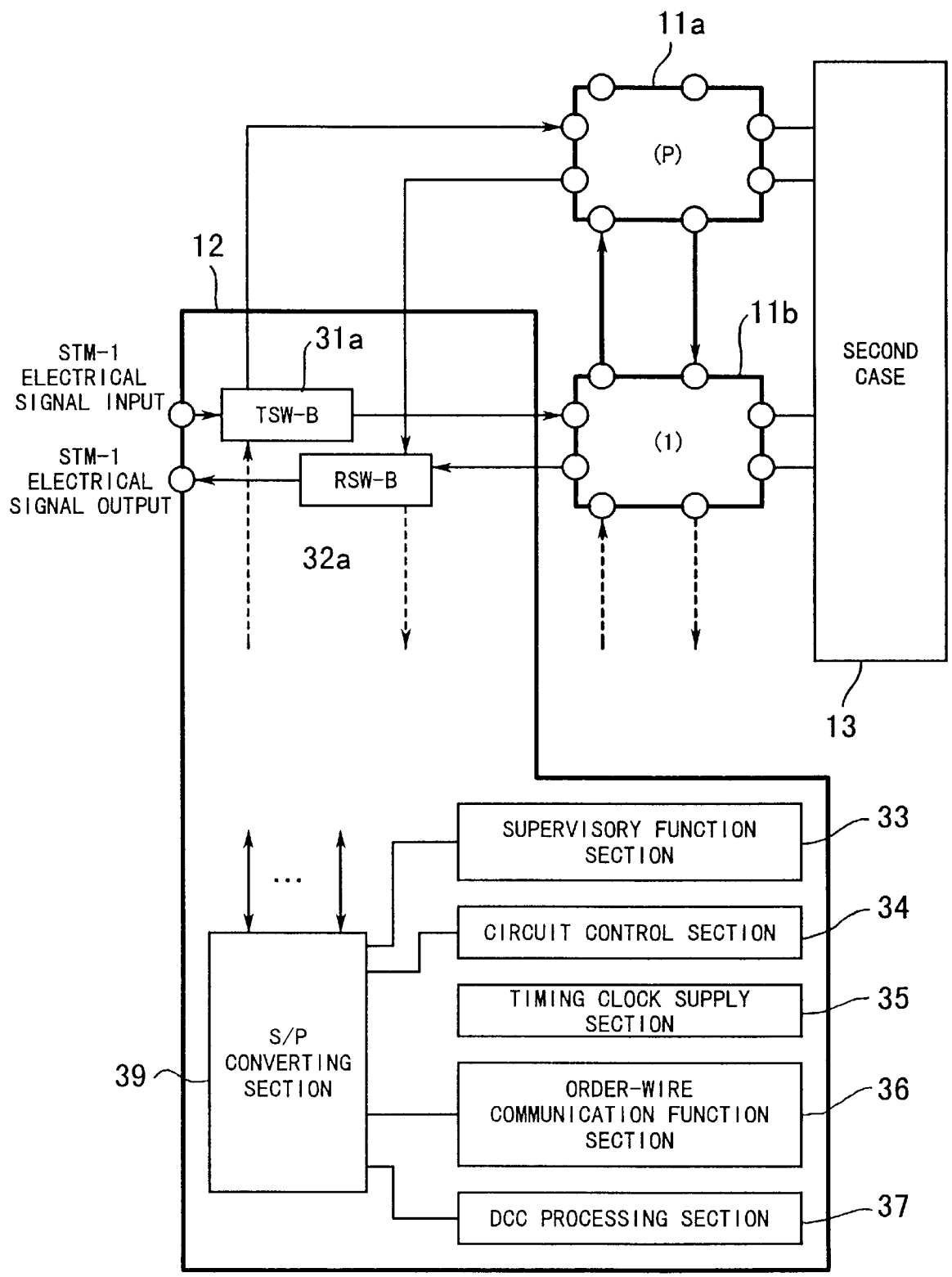
FIG. 6 is a schematic view of a third embodiment.

FIG. 6 is a schematic view of the second embodiment. Since the configuration of the third embodiment is basically the same as that of the first embodiment, the same reference numeral is applied to the same element, and the explanation thereof is omitted.

In the third embodiment, the first case 12 is provided with an S/P converting section 39. The S/P converting section 39 is connected to respective unit cases 11a to 11f. The S/P converting section 39 converts a serial signal sent from one of the unit cases 11a to 11f into a parallel signal and sends it to the supervisory function section 33, circuit control section 34, order-wire communication function section 36, and DCC processing section 37. Inversely, the S/P converting section 39 converts a signal sent from the supervisory function section 33, circuit control section 34, order-wire communication function section 36, and DCC processing section 37 into a serial signal and sends it to the corresponding one of the unit cases 11a to 11f. By such a serial signal, a supervisory system information signal is transmitted between the unit case and the supervisory function section 33. Between the unit case and the supervisory function section 34, information signal (DSC) which is transmitted and received between the opposite stations for line switching, an initiator, which is information from a faulty line, a switching command for line switching, etc. are transmitted. Between the unit case and the order-wire communication function section 36, E1, E2 bite information in the SOH of STM-1 signal is transmitted. Between the unit case and the DCC processing section 37, the DCC signal is transmitted.

As described above, in the third embodiment, one serial transmission path is merely connected from each unit case to the S/P converting section 39, by which information is transmitted between each unit case and the supervisory function section 33, circuit control section 34, order-wire communication function section 36, and DCC processing section 37 provided in the first case 12 by using a serial signal. Conventionally, the transmission path is individually connected from each of the unit cases 11a to 11f to each of the supervisory function section 33, circuit control section 34, order-wire communication function section 36, and DCC processing section 37 provided in the first case 12, so that the number of wires is very large. Contrarily, in the third embodiment, information is transmitted by using a serial signal, so that the number of wires is reduced significantly.

In the above-described first to third embodiments, the STM-1 electrical signal is handled. However, the present invention is not limited to the STM-1 electrical signal, and it can generally be applied to the STM-N electrical signal.

Also, an optical signal may be terminated, subjected to O/E conversion, and connected to the first case 12 of any of the first to third embodiments. In this case, the optical signal terminating device and the O/E converting device are mounted so as to be positioned below the first case 12 in the rack 14 shown in FIG. 2.

Although only one spare line is provided in the first to third embodiments, two or more spare lines may be provided.

Also, although the power supply section 28 is incorporated in the unit case in the first to third embodiments, the power supply section may be provided outside the unit case as a device common to all unit cases.

As described above, in the present invention, the respective unit cases are arranged for each of a plurality of active lines and at least one spare line. The unit cases have the same configuration, and are configured so as to be portable and replaceable. Each of the unit cases includes the base band processing section, modulating section, transmitting section, receiving section, demodulating section, transmission switching section, and receiving end switching section.

Such a unified configuration reduces the installation space of the whole system and decreases the wiring space and wiring cost.

Also, the laying of wires outside the case is reduced, so that electro magnetic interference is prevented.

Also, the unified configuration significantly reduces the number of cases as compared with the conventional divided configuration, so that the time taken for the repair of fault can be shortened.

Further, the unified configuration reduces the number of objects to be supervised by the supervisory function section, so that the processing load of the supervisory function section is relieved.

Further, in the unit case, if a frequency shifter is connected between the output port for outputting a radio signal and the input port for inputting a radio signal to turn a signal in the unit case, the transmission test of the unit case can be made easily. Especially in the temperature test, all we have to do is to put only the unit case in a thermostatic oven, so that only a small thermostatic oven is needed, being very convenient.

Further, the transmission switching section of the unit case transfers the base band signal, which is sent from the transmission switching section of the first adjacent unit case toward the spare line, to the transmission switching section of the second adjacent unit case, and the receiving end switching section of the unit case transfers the base band signal, which is sent from the spare line via the receiving end switching section of the second adjacent unit case, to the receiving end switching section of the first adjacent unit case. Therefore, transmission switching and receiving end switching can be achieved easily by merely connecting the adjacent transmission switching sections to each other and the adjacent receiving end switching sections to each other of all unit cases arranged in parallel.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A digital multiplex radio system which, having a plurality of active lines and at least one spare line, transmits and receives a radio signal with a Synchronous Transfer Mode (STM) signal used as a base band signal, comprising;
   a plurality of unit cases which have the same configuration, and are portable and replaceable, and one of which is provided for each of a plurality of active lines and at least one spare line;
   a base band processing section, which is contained in each of said unit cases, for inserting Section Over Head (SOH) bite in the STM signal or extracting SOH bite from the STM signal;
   a modulating section, which is contained in each of said unit cases, for modulating the base band signal and outputting the modulated signal;
   a transmitting section, which is contained in each of said unit cases, for converting the modulated signal from said modulating section into a radio signal and transmitting the radio signal;
   a receiving section, which is contained in each of said unit cases, for receiving the radio signal and converting it into a modulated signal;
   a demodulating section, which is contained in each of said unit cases, for converting the modulated signal from said receiving section into a baseband signal;
   a transmission switching section, which is contained in each of said unit cases, for sending the baseband signal on the self line to the self line and the spare line;
   a receiving end section, which is contained in each of said unit cases, for selecting one signal out of the base band signals sent from the self line and the spare line and sending the selected signal to the self line;
   a transmission switching section output port, which is provided on a surface of each of said unit cases, for sending the baseband signal from the transmission switching section of the self unit case to the transmission switching section of the unit case on another line;
   a transmission switching section input port, which is provided on a surface of each of said unit cases, for receiving the baseband signal from the transmission switching section of the unit case on another line to the transmission switching section of the self unit case;
   a receiving end switching section output port, which is provided on a surface of each of said unit cases, for sending the baseband signal from the receiving end switching section of the self unit case to the receiving end switching section of the unit case on another line; and
   a receiving end switching section input port, which is provided on a surface of each of said unit cases, for receiving the baseband signal from the receiving end switching section of the unit case on another line to the receiving end switching section of the self unit case.

2. A digital multiplex radio system according to claim 1, wherein the transmission switching section output port of the self unit case is connected to the transmission switching section input port of the adjacent unit case, and the receiving end switching section output port of said adjacent unit case is connected to the receiving end switching section input port of said self unit case.

3. A digital multiplex radio system according to claim 1, wherein in each of said unit cases, said transmission switching section is connected between said base band processing section and said modulating section.

4. A digital multiplex radio system according to claim 1, wherein in each of said unit cases, said receiving end switching section is connected between said demodulating section and said base band processing section.

5. A digital multiplex radio system which, having a plurality of active lines and at least one spare line, transmits and receives a radio signal with a Synchronous Transfer Mode (STM) signal used as a base band signal, comprising:
   a plurality of unit cases which have the same configuration, and are portable and replaceable, and one of which is provided for each of a plurality of active lines and at least one spare line;
   a base band processing section, which is contained in each of said unit cases, for inserting Section Over Head (SOH) bite in the STM signal or extracting SOH bite from the STM signal;
   a modulating section, which is contained in each of said unit cases, for modulating the base band signal and outputting the modulated signal;
   a transmitting section, which is contained in each of said unit cases, for converting the modulated signal from said modulating section into a radio signal and transmitting the radio signal;
   a receiving section, which is contained in each of said unit cases, for receiving the radio signal and converting it into a modulated signal;

a demodulating section, which is contained in each of said unit cases, for converting the modulated signal from said receiving section into a baseband signal;

a transmission switching section, which is contained in each of said unit cases, for sending the baseband signal on the self line to the self line and the spare line;

a receiving end section, which is contained in each of said unit cases, for selecting one signal out of the base band signals sent from the self line and the spare line and sending the selected signal to the self line;

an STM signal input port, which is provided on the surface of each of said unit cases, for inputting the STM signal on the self-line to the self unit case;

an STM signal output port, which is provided on the surface of each of said unit cases, for outputting the STM signal on the self-line from the self unit case;

a plurality of transmission switches, each of which is connected to the STM signal input port of each of said unit cases for active line, for sending the STM signal on the self-line to the unit case on the self-line and the unit case on the spare line; and a plurality of receiving end switches, each of which is connected to the STM signal output port of each of said unit cases for active line, for selecting one of the STM signals sent from the unit case on the self-line and the unit case on the spare line and sending the selected signal to the self-line.

6. A digital multiplex radio system which, having a plurality of active lines and at least one spare line, transmits and receives a radio signal with a Synchronous Transfer Mode (STM) signal used as a base band signal, comprising:

a plurality of unit cases which have the same configuration, and are portable and replaceable, and one of which is provided for each of a plurality of active lines and at least one spare line;

a base band processing section, which is contained in each of said unit cases, for inserting Section Over Head (SOH) bite in the STM signal or extracting SOH bite from the STM signal;

a modulating section, which is contained in each of said unit cases, for modulating the base band signal and outputting the modulated signal;

a transmitting section, which is contained in each of said unit cases, for converting the modulated signal from said modulating section into a radio signal and transmitting the radio signal;

a receiving section, which is contained in each of said unit cases, for receiving the radio signal and converting it into a modulated signal;

a demodulating section, which is contained in each of said unit cases, for converting the modulated signal from said receiving section into a baseband signal;

a transmission switching section, which is contained in each of said unit cases, for sending the baseband signal on the self line to the self line and the spare line;

a receiving end section, which is contained in each of said unit cases, for selecting one signal out of the base band signals sent from the self line and the spare line and sending the selected signal to the self line;

a Way-Side(WS)signal input port, which is provided on the surface of each of said unit cases, for inputting a WS signal on the self-line to the self unit case;

a WS signal output port, which is provided on the surface of each of said unit cases, for outputting the WS signal on the self-line from the self unit case; a User-Channel (UC)signal input port, which is provided on the surface of each of said unit cases, for inputting a UC signal on the self-line to the self unit case; and a UC signal output port, which is provided on the surface of each of said unit cases, for outputting the UC signal on the self-line from the self unit case; transmission switches each being connected to the WS signal input port and the UC signal input port of the unit case on the corresponding active line and connected to the WS signal input port and the UC signal input port of the unit case on said at least one spare line for sending the WS signal and UC signal on the self line to the unit case on the self line and the unit case on said at least one spare line; and receiving end switches each being connected to the WS signal output port and the UC signal output port of the unit case on the corresponding active line and connected to the WS signal output port and the UC signal output port of the unit case on said at least one spare line for selecting one signal the WS signals and UC signals each sent from the unit case on the self-line and the unit case on said at least one spare line and sending the selected signal to the self-line.

7. A digital multiplex radio system according to claim 5, further comprising a first case which contains a supervisory function section, circuit control section, timing clock supply section, order-wire communication function section, and Data Communication Channel (DCC) processing section as well as said transmission switches and said receiving end switches.

8. A digital multiplex radio system according to claim 7, further comprising a serial/parallel converting section, which is contained in said first case, for converting each signal sent from said supervisory function section, said circuit control section, said order-wire communication function section, and said DCC processing section into a serial signal and sending the converted signal to the parts contained in each of said unit cases, and for converting a serial signal sent from the parts contained in each of said unit cases into a parallel signal and sending the converted signal to said supervisory function section, said circuit control section, said order-wire communication function section, and said DCC processing section.

9. A digital multiplex radio system according to claim 7, wherein said unit cases are mounted in a rack, and said first case is mounted in said rack so as to be positioned below said unit cases.

10. A digital multiplex radio system according to claim 1, wherein said radio system further comprises a second case which contains a plurality of transmitting filters and a plurality of receiving filters provided for each line and an antenna sharing device, and said unit cases are mounted in a rack, and said second case is mounted in said rack so as to be positioned above said unit cases.

* * * * *